(12) United States Patent
Chow

(10) Patent No.: US 6,944,174 B1
(45) Date of Patent: Sep. 13, 2005

(54) JITTER REDUCTION OF VOICE PACKETS IN A PACKET-BASED NETWORK

(75) Inventor: Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 895 days.

(21) Appl. No.: 09/809,015

(22) Filed: Mar. 16, 2001

(51) Int. Cl.[7] ............................................... H04L 12/28
(52) U.S. Cl. ................... 370/413; 370/232; 379/90.01; 709/219
(58) Field of Search ................................ 370/229–232, 370/401, 412–417, 235, 395.42, 418; 711/165; 710/56; 379/90.01; 709/219

(56) References Cited

U.S. PATENT DOCUMENTS

| | | | |
|---|---|---|---|
| 5,893,924 A * | 4/1999 | Vakkalagadda | ............. 711/165 |
| 6,091,709 A * | 7/2000 | Harrison et al. | ............ 370/235 |
| 6,128,654 A * | 10/2000 | Runaldue et al. | ............ 709/219 |
| 6,134,217 A * | 10/2000 | Stiliadis et al. | ............. 370/232 |
| 6,401,147 B1 * | 6/2002 | Sang et al. | .................... 710/56 |
| 6,442,166 B1 * | 8/2002 | McDonald et al. | .... 370/395.42 |
| 6,757,367 B1 * | 6/2004 | Nicol | ...................... 379/90.01 |

* cited by examiner

*Primary Examiner*—Phirin Sam
*Assistant Examiner*—Robert W. Wilson
(74) *Attorney, Agent, or Firm*—Harrity & Snyder LLP

(57) ABSTRACT

A multiport device includes a time-stamping component that appends a time-stamp value to voice packets. Output queues use the time-stamp value to monitor the time the packet spends in the output queue. If the packet is in the queue for greater than a predetermined amount of time, a time-stamp control component expedites the processing of the packet. In this manner, jitter introduced into the voice packet by variable length delays in the network device can be controlled.

18 Claims, 5 Drawing Sheets

JITTER REDUCTION OF VOICE PACKETS IN A PACKET-BASED NETWORK

BACKGROUND OF THE INVENTION

1. Technical Field

The present invention relates generally to switching in a packet switched network and, more specifically, to systems and methods that ensure that certain types of packets, such as packets carrying voice information, are switched smoothly and with an acceptable amount of jitter.

2. Background Art

At the backbone of most networks are switches interconnected via a communications medium. For example, Ethernet is a commonly used local area network scheme in which multiple stations are connected to a single shared serial data path. These stations communicate with a switch located between the shared data path and the stations connected to that path. The switch controls the communication of data packets on the network.

Packets may be used to transmit a variety of different types of information. One use for packets in a packet-switched network is to carry real-time voice information. The transfer of voice traffic over packet networks, and especially voice over IP (Internet Protocol) based networks, is rapidly gaining acceptance. A primary reason for this is that Voice over IP (VoIP) packet transfers may significantly reduce the per-minute cost of a voice connection relative to using traditional dedicated line connections.

One common concern in VoIP packet transfers is possible degradation in voice quality relative to traditional voice systems. Voice quality may be degraded for a number of reasons, including undue delay in transmitting packets through the switches in the network. Delays encountered in the transmission path of a packet can be characterized as variable delays and fixed delays. Fixed delays, such as the propagation time of a particular portion of the network, are about the same for every packet. Variable delays, or "jitter," such as queuing time and media access time at a switch, may vary from one packet to the next. Due to jitter, one packet may be transmitted before a second packet, but yet received after the second packet.

To accommodate packet delays, a VoIP voice playing device may have a "playout" buffer for removing jitter from the packets. When the first packet in a conversation reaches the playout buffer, it is delayed an amount equal to the maximum allocated jitter. In this manner, no packet will be read out of the buffer while an earlier packet is still traversing the network.

Although the playout buffer assures that packets will not be read out-of-order, it also increases the total delay of the system because of the delay implemented by the buffer. If the total delay becomes too great, users will notice degradation in the quality of the voice playback.

Thus, there is a need in the art to manage and reduce packet delay for voice packets as the packets travel through switches in a network.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the present invention, a multiport network device includes receive ports and transmit ports. A time-stamping component receives frames from the receive ports and appends a time-stamp value to those of the received frames that correspond to voice transmissions. Output queues receive the frames from the output of the time-stamping component and forward the received frames to appropriate ones of the transmit ports. The output queues expedite the forwarding of the received frames that have appended time-stamp values after a predetermined period of time has elapsed from the time-stamp value.

A second aspect of the present invention is directed to a method of processing packets in a network device. The method comprises receiving frames at the network device, where the frames include a source field indicating the source of the frame and a destination field indicating an intended destination for the frame. A time stamp value is appended to the frames that are associated with voice information. Processing of the frames in an output queue is expedited when a predetermined period of time has elapsed since the time-stamp value of the frames.

BRIEF DESCRIPTION OF THE DRAWINGS

The accompanying drawings, which are incorporated in and constitute a part of this specification, illustrate an embodiment of the invention and, together with the description, explain the invention. In the drawings.

BEST MODE FOR CARRYING OUT THE INVENTION

Figure 1:
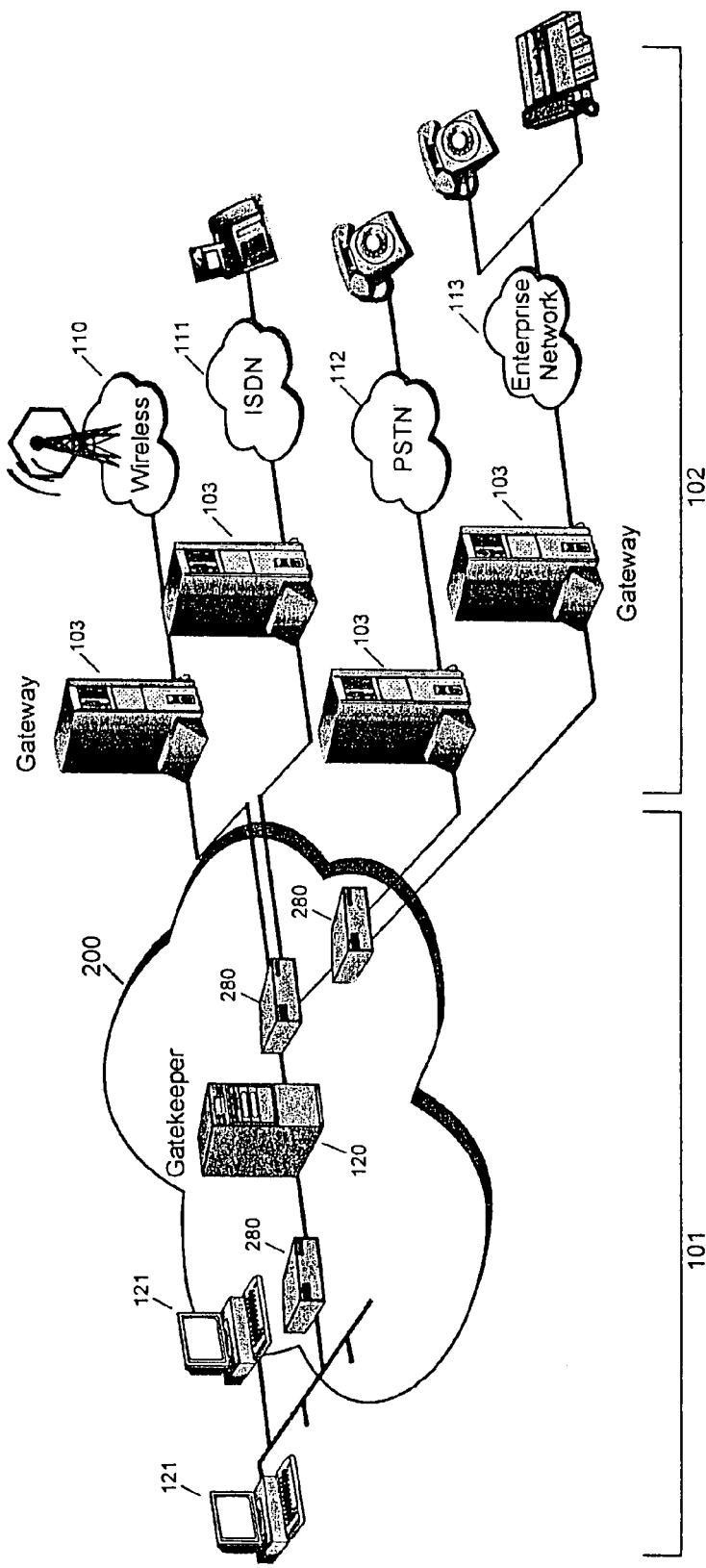
FIG. 1 is a high-level diagram of an exemplary network for implementing VoIP transmissions.

The following detailed description of the invention refers to the accompanying drawings. Like objects in the drawings may be referred to using the same reference numeral in different drawings. The detailed description does not limit the invention. Instead, the scope of the invention is defined by the appended claims and equivalents.

As described herein, a multiport switch includes a time-stamping component that appends a time-stamp value to voice packets. The time-stamp value allows the multiport switch to monitor the voice packets as they progress through queues in the switch. If the packet spends too long in the switch, as indicated by the time-stamp value, the switch expedites further processing of the packet.

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

FIG. 1 is a high-level diagram of an exemplary network 100 for implementing VoIP (voice over IP) transmissions. The left side of network 100, shown as network portion 101, is a packet switched network such as the network 200, shown in more detail in FIG. 2. The right side of network 100, shown as network portion 102, illustrates different types of conventional voice networks. Gateways 103 present an interface between the packet-based network portion 101 and the traditional voice network portion 102. Gateways 103 may translate signaling messages between the two sides as well as compress and decompress the voice data.

As shown, the conventional voice portion of network 100 may include wireless networks 110, ISDN-based networks 111, PSTN-based networks 112, and enterprise networks 113.

The packet switched portion 101 of network 100 includes multiport switches 280, a gatekeeper 120, and end-terminals 121. Terminals 121 may be PC-based phones or specialized digital phones. Voice data spoken in one of end-terminals 121 is digitized, compressed with a voice CODEC (Compressor/Decompressor), and transmitted as voice data packets through network 200. Switches 280 route the voice packets to gateways 103. A gatekeeper 120 may additionally be used in network portion 101 to perform admission control functions for packets traversing the network. Gatekeeper 120 could, for instance, provide address translation (routing) for devices in various zones defined within network 200. Another possible function of gatekeeper 120 is to provide admission control by specifying what devices can call what numbers.

Figure 2:
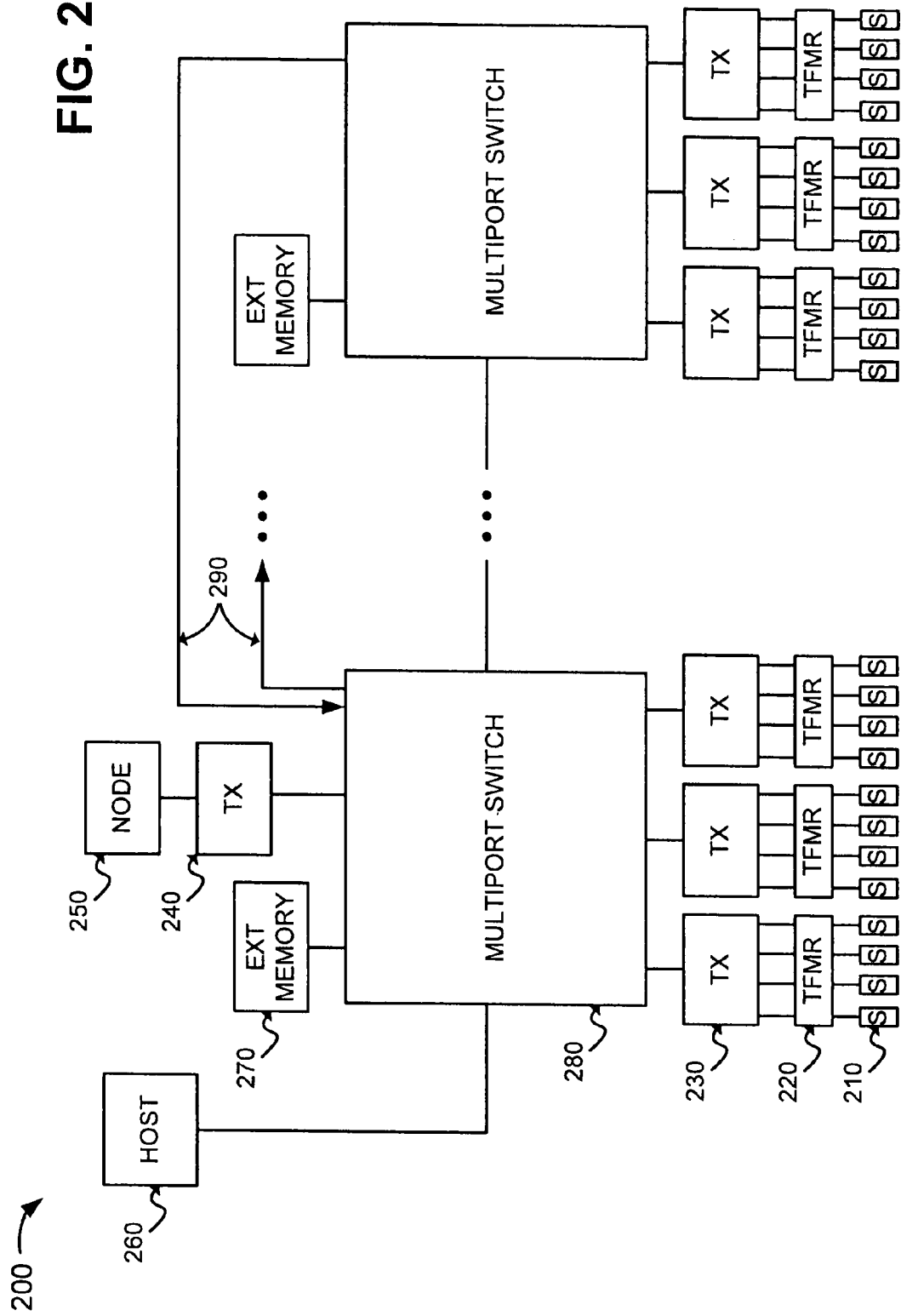
FIG. 2 is a block diagram of an exemplary system in which systems and methods consistent with the present invention may be implemented.

FIG. 2 is a block diagram illustrating packet-switched network 200 in more detail. The packet-switched network 200 may be an Ethernet (IEEE 802.3) based network. The packet switched network 200 may include network stations 210, transformers 220, transceivers 230 and 240, a network node 250, a host 260, external memories 270, and multiport switches 280. The network stations 210 may include conventional communication devices, such as computers, with different configurations. For example, the devices may send and receive data at network data rates of 10 megabits per second (Mb/s) or 100 Mb/s.

Each 10/100 Mb/s network station 210 may send and receive data to and from a multiport switch 280 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 210 to access the network channel with equality. Traffic in a half-duplex environment may not be distinguished over the transmission medium. Rather, each half-duplex station 210 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 210 having data to send may attempt to access the channel by waiting a predetermined amount of time, known as the interpacket gap interval (IPG), after deassertion of the receive carrier on the transmission medium. If multiple stations 210 are connected to the same link, each of the stations 210 may attempt to transmit data in response to the sensed deassertion of the receive carrier and after the IPG interval, possibly resulting in a collision. Hence, the transmitting station 210 may monitor the transmission medium to determine if there has been a collision due to another station 210 sending data on the same link at the same time. If a collision is detected, both stations 210 cease transmitting, wait a random amount of time, and then retry the transmission.

The 10/100 Mb/s network stations 210 that operate in full duplex mode may send and receive data packets according to the Ethernet standard IEEE 802.3. The full duplex environment provides a two-way, point-to-point communication link enabling simultaneous transmission and reception of data packets between each link partner (i.e., the 10/100 Mb/s network station 210 and the corresponding multiport switch 180).

The transformers 220 may include magnetic transformers that provide AC coupling between the network stations 210 and the transceivers 230. The transceivers 230 may include 10/100 Mb/s physical layer transceivers that communicate with the multiport switches 280 via respective serial media independent interfaces (SMIIs) or reduced media independent interfaces (RMIIs). Each of the transceivers 230 may be configured to send and receive data packets between the multiport switch 280 and up to four network stations 210 via the SMII/RMII. The SMII/RMII may operate at a data rate sufficient to enable simultaneous transmission and reception of data packets by each of the network stations 210 and the corresponding transceiver 230.

The transceiver 240 may include one or more 1000 Mb/s (i.e., 1 Gb/s) physical layer transceivers that provide communication with nodes, such as the network node 250, via, for example, a high speed network transmission medium. The network node 250 may include one or more 1 Gb/s network nodes that send and receive data packets at a network speed of 1 Gb/s. The network node 250 may include, for example, a server or a gateway to a high-speed backbone network.

The host 260 may include a computer device that provides external management functions to control the overall operation of the multiport switches 280. The external memories 270 may include synchronous static random access memories (SSRAMs) that provide external storage for the multiport switches 280. Each of the external memories 270 may include a Joint Electron Device Engineering Council (JEDEC) pipelined burst or Zero Bus Turnaround (ZBT) SSRAM having a 64-bit wide data path and a 17-bit wide address path. The external memories 270 may be addressable as upper and lower banks of 128K in 64-bit words. The size of the external memories 270 is preferably at least 1 Mbyte with data transfers possible on every clock cycle through pipelining.

The multiport switches 280 selectively forward data packets received from the network stations 210 or the network node 250 to the appropriate destination according to the appropriate transmission protocol, such as the Ethernet protocol. The multiport switches 280 may be cascaded together (via lines 290) to expand the capabilities of the multiport switches 280. The packets may be routed using the Internet Protocol (IP).

Network stations 210 may transmit data packets on network 200 as data packets that carry voice information.

Figure 3:
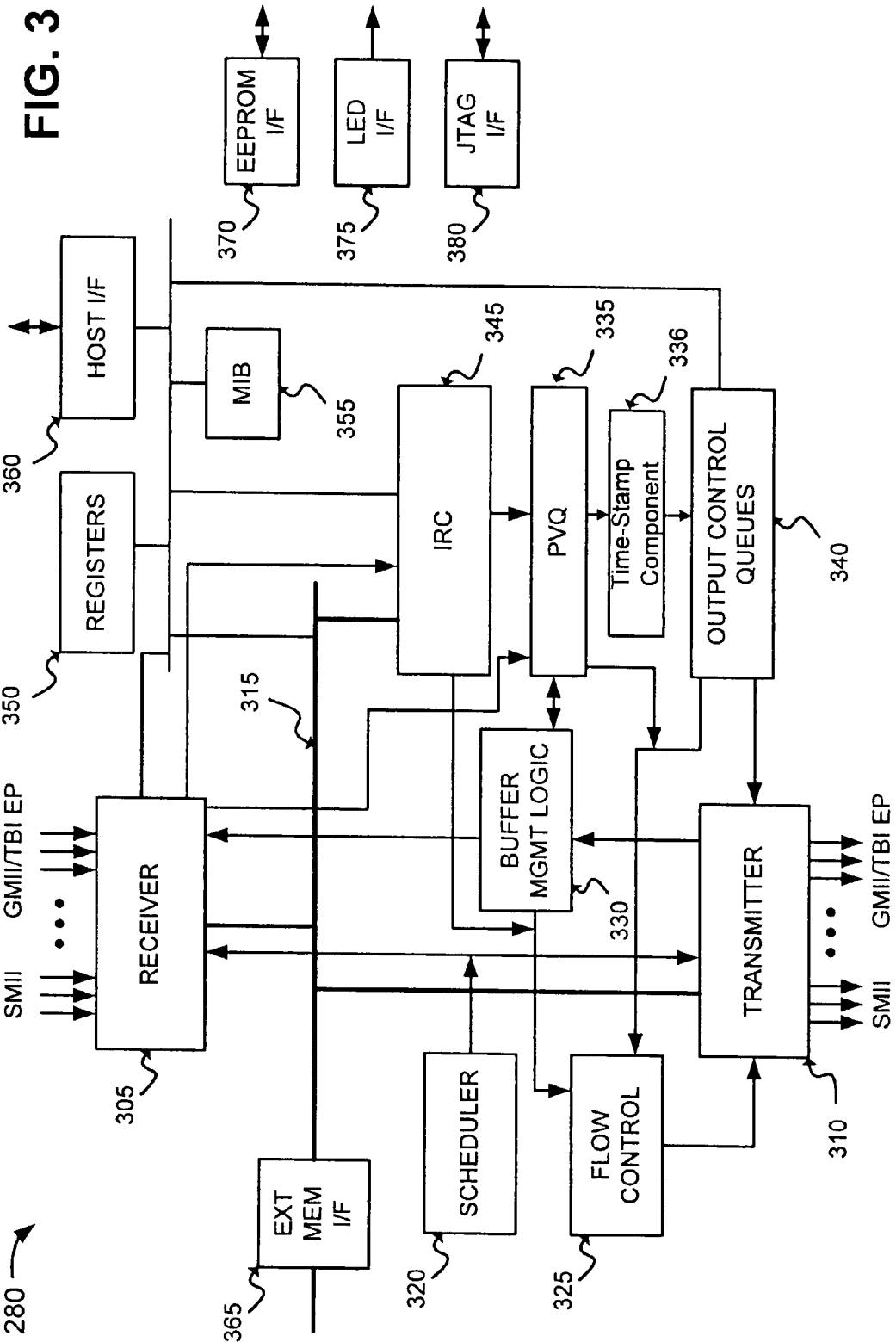
FIG. 3 is a detailed diagram of one of the multiport switches shown in FIG. 1.

FIG. 3 is a detailed diagram of one of the multiport switches 280 according to an implementation consistent with the present invention. The multiport switch 280 may include a receiver 305, a transmitter 310, a data bus 315, a scheduler 320, flow control logic 325, buffer management logic 330, a port vector queue (PVQ) 335, output control queues 340, an internal rules checker (IRC) 345, registers 350, management information base (MIB) counters 355, a host interface 360, an external memory interface 365, an EEPROM interface 370, an LED interface 375, and a Joint Test Action Group (JTAG) interface 380.

The receiver 305 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 280 (FIG. 2). The expansion ports (EPs) may be used to transfer data between other multiport switches 280 according to a prescribed protocol. The expansion ports may permit the multiport switches 280 to be cascaded together to form a backbone network. Each of the receive modules may include queuing logic that receives data packets from the network stations 210 and/or network node 250 and stores the packets in the corresponding receive FIFOs. The queuing logic may then send portions of the packets to the IRC 345 for processing and to the external memory 270 for storage via the external memory interface 365.

The transmitter 310 may include MAC modules and transmit buffers, such as FIFO buffers. The transmit modules may include output ports that support SMIIs, GMIIs, TBIs, and proprietary interfaces for expansion with other multiport switches 280. Each of the transmit modules may include dequeuing logic that obtains packets from the external memory 270 and stores the packets in the corresponding transmit FIFOs. The transmit modules may read the data packets from the corresponding transmit FIFOs and transmit the packets to the network stations 210 and/or network node 250. In an alternative implementation consistent with the present invention, the functions of the receiver 305 and transmitter 310 may be performed by a transceiver that manages both the receiving and transmitting of data packets.

The data bus 315 may include one or more conductors that connect the receiver 305, the transmitter 310, the IRC 345, and the external memory interface 365. The scheduler 320 may include logic that controls access to the external memory 270 by the queuing and dequeuing logic of the receiver 305 and transmitter 310, respectively. The multiport switch 280 is configured to operate as a non-blocking switch, where network data is received and transmitted from the switch ports at the respective wire rates of 10, 100, or 1000 Mb/s. Hence, the scheduler 320 may control the access by different ports to optimize use of the bandwidth of the external memory 270.

The flow control logic 325 may include logic that operates in conjunction with the buffer management logic 330, the PVQ 335, and the output control queues 340 to control the transmission of packets by the transmitter 310. The flow control logic 325 may control the transmitter 310 so that the transmitter 310 outputs packets in an efficient manner based on the volume of data traffic. The buffer management logic 330 may include logic that oversees the use of memory within the multiport switch 280. For example, the buffer management logic 330 may manage the use of frame pointers and the reuse of frame pointers once the data packet has been transmitted to its designated output port(s). Frame pointers identify the location of data frames stored in the external memory 270 that require transmission.

The PVQ 335 may include logic that obtains a frame pointer to the appropriate output queue(s) in output control queues 340 that correspond to the output ports to receive the data frame transmission. For multicopy frames, the PVQ 335 may supply multiple copies of the same frame pointer to more than one output queue. The output control queues 340 may include a FIFO-type output queue corresponding to each of the transmit modules in the transmitter 310. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 270 to read data frames at the memory locations specified by the frame pointers.

The IRC 345 may include an internal decision making engine that makes frame forwarding decisions for data packets that are received by the receiver 305. The IRC 345 may monitor (i.e., "snoop") the data bus 315 to determine the frame pointer value and a part of the data frame, for example, the header informa for example, the header informading the source, destination, and virtual local area network (VLAN) address information. The IRC 345 may use the header information to determine which output port will output the data frame stored at the location specified by the frame pointer. The IRC 345 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 345 may use the destination address to identify the appropriate output port to output the data frame. The frame header may also include VLAN address information that identifies the frame as information destined to one or more members of a group of network stations 210. The IRC 345 may alternatively determine that a data frame should be transferred to another multiport switch 280 via the expansion port. Therefore, the IRC 345 determines whether a frame temporarily stored in the external memory 270 should be output to a single output port, multiple output ports, no output port, or another multiport switch 280.

The IRC 345 may output its forwarding decision to the PVQ 335 in the form of a forwarding descriptor. The forwarding descriptor may include, for example, a priority class identifying whether the data frame is high priority or low priority, a port vector identifying each output port that should transmit the frame, the input port number, or VLAN information. The PVQ 335 may decode the forwarding descriptor to obtain the frame pointer. The PVQ 335 may then supply the frame pointer to the appropriate output queues within the output control queues 340.

The IRC 345 may also perform layer 3 filtering. For example, the IRC 345 may examine each received data packet for up to 138 programmable patterns and process the packet based on the result. The result may dictate that the IRC 345 drop the packet, forward the packet to the host 260, or assign a user priority or a Differentiated Services Code Point (DSCP) to the packet. User priorities and the DSCP may be independently mapped into output priority classes.

The registers 350 may include configuration and status registers used by the host interface 360. The MIB counters 355 may provide statistical network information in the form of MIB objects for use by the host 260. The host interface 360 may include a standard interface that permits an external management entity, such as the host 260, to control the overall operation of the multiport switch 280. The host interface 360 may decode host accesses within a prescribed register space and read and write configuration and status information to and from the registers 350.

The external memory interface 365 may include a standard interface that permits access to the external memory 270. The external memory interface 365 may permit external storage of packet data in the external memory 270 in a direct memory access (DMA) transaction during an assigned time slot determined by the scheduler 320. In an implementation consistent with the present invention, the external memory interface 365 operates at a clock frequency of at least 66 MHz and, preferably, at a frequency of 100 MHz or above.

The EEPROM interface 370 may include a standard interface to another external memory, such as an EEPROM. The LED interface 375 may include a standard interface to external LED logic. The LED interface 375 may send the status of conditions of the input and output ports to the external LED logic. The LED logic may drive LED display elements that are human-readable. The JTAG interface 380 may include a standard interface to external testing equipment to permit, for example, a boundary scan test to be performed on the multiport switch 180.

A time-stamp component 336 may be placed between PVQ 335 and the output control queues 340. Time-stamp component 336, as will be described in more detail below, may set a time-stamp data field in the forwarding descriptors received from PVQ 335.

Figure 4:
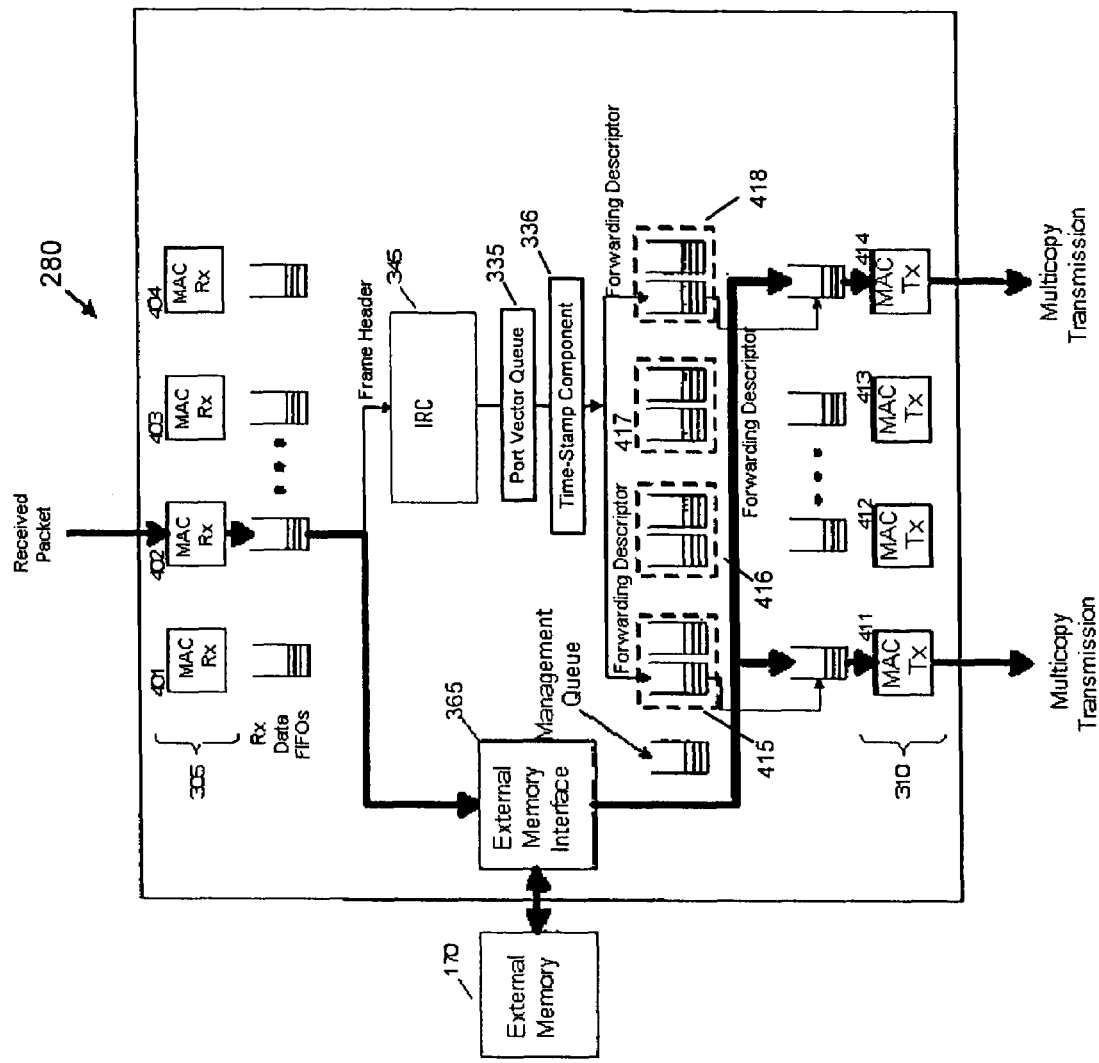
FIG. 4 is a diagram illustrating, at a high level, the data flow path of a frame through a multiport switch.

FIG. 4 is a diagram illustrating, at a high level, the data flow path of a frame through multiport switch 280. Each frame is received at one of the ports, labeled as ports 401–404, in MAC receiver 305. Each frame includes a header portion and a body (frame data) portion. To conserve memory on switch 280, the multiport switch 280 splits the header portion from the data portion. The data portion may then be stored, via external memory interface 365, off-chip in external memory 270. The header is forwarded to IRC 345. Based on the information in the header, IRC 345 generates, using an address lookup table, a forwarding descriptor that identifies the correct transmit port(s) 310 from which the frame is to be transmitted. The PVQ 335 receives the forwarding descriptor and forwards it to the time-stamp component 336.

Time-stamp component 336 may be placed between PVQ 335 and output queues 415–418. Time-stamp component 336 attaches a time-stamp value to each forwarding descriptor that corresponds to a voice packet. Whether a frame corresponds to a voice packet may be determined by IRC 345 by, for example, tagging packets that originate from a certain port (or have a certain source address) as voice packets or by tagging packets that are received with an intrinsic indication that they are real-time packets. Time-stamp component 336 checks the voice-packet tag applied by IRC 345, and appends a time-stamp value to any forwarding descriptor that is tagged as a voice packet.

The time-stamp component 336 then forwards the forwarding descriptor to one of output queues 415–418 in the control queues 340 that correspond to the frame output port. Each output queue 415–418 may include two sub-queues: a high priority queue and a low priority queue. Output queues 415–418 will be described in more detail below with reference to FIG. 5.

After being reunited with its data portion, the packet is transmitted on the appropriate one of the MAC transmission ports 310, labeled as ports 411–414.

The time-stamp value appended by the time-stamp component 336 is used by output queues 415–418 to control the maximum jitter (variable delay) attributable to the time the forwarding descriptor spends in the output queues. More specifically, if the forwarding descriptor is still in the output queue after a predetermined maximum time has passed, circuitry in the output queue recognizes that the predetermined maximum time has passed since the time-stamping and expedites processing of the forwarding descriptor by the output queue. In this manner, the amount of jitter introduced to a packet in multiport switch 280 can be controlled.

Figure 5:
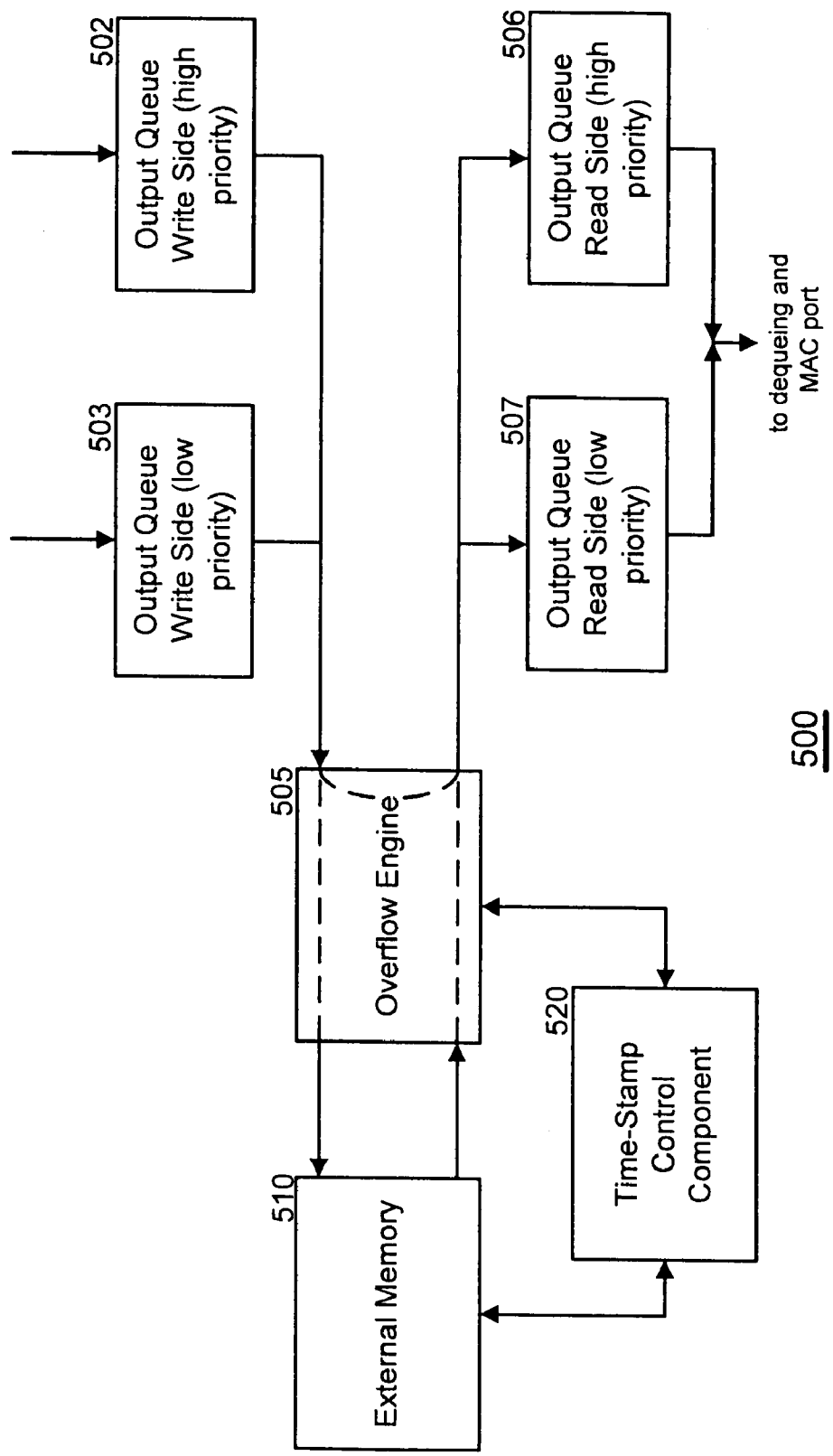
FIG. 5 is a diagram illustrating, in additional detail, an output queue of the multiport switch shown in FIG. 1.

FIG. 5 is a diagram illustrating an output queue 500, such as one of output queues 415–418, in more detail. Output queue 500 includes a write side high-priority FIFO 502 and a write side low priority FIFO 503. The forwarding descriptors from IRC 345 may include a frame priority field. Forwarding descriptors marked as "high" priority by IRC 345 are sent to high-priority FIFO 502 and forwarding descriptors marked "low" priority are sent to low-priority FIFO 503. Forwarding descriptors in the high-priority FIFO 502 are given processing priority over frames in low priority FIFO queue 503. The priority field may be independent of the field tagging the forwarding descriptor as a voice or non-voice packet.

Overflow engine 505 routes frame descriptors from FIFOs 502 and 503 to either an external memory 510 or directly to read side FIFOs 506 and 507. More particularly, output queue 500 includes a high-priority output FIFO queue 506 and a low-priority output FIFO queue 507. If the low-priority FIFO queue 507 is full, overflow engine 505 routes low-priority forwarding descriptors to external memory 510, which may be a high-speed random access memory, such as memory 170. As space opens up in the read side FIFO 507, overflow engine 505 accesses external memory 510 and moves previously written low-priority frames to FIFO 507. Overflow engine 505 similarly controls the flow of high-priority forwarding descriptors from FIFO 502 to FIFO 506. Forwarding descriptors in low and high priority queues 506 and 507 are written to dequeuing logic and then to the MAC ports 411–414 for network transmission. Forwarding descriptors in high-priority queue 506 are given dequeueing priority over forwarding descriptors in low-priority queue 507.

Time-stamp control component 520 is coupled to both external memory 510 and overflow engine 505. In operation, time stamp-control component 520 monitors forwarding descriptors in external memory 510 that have an associated time stamp (i.e., if the forwarding descriptors correspond to a voice packet). If a preset time period (e.g., 150 ms) has elapsed since the time stamp, as determined by comparing the time stamp value to the present time, time-stamp control component 520 expedites the processing of the forwarding descriptor by notifying overflow engine 505 that the forwarding descriptor with the expiring time stamp value should be the next one moved from external memory 510 to its output queue 506 or 507. Additionally, for even further expedition of the packet, overflow engine 505 may write the forwarding descriptor with the expired time stamp to a location in FIFO queue 506 or 507 that is ahead of the normal end-of-queue location.

Time-stamp control component 520 may be implemented by monitoring the forwarding descriptors written to external memory 510 and creating a table in which each table entry includes a pointer to the forwarding descriptor in external memory 510 and the time-stamp value associated with the forwarding descriptor. Time-stamp control component 520 may sort the table based on the time-stamp values, and can thus easily determine when a particular time stamp expires.

As described above, time-stamp control component 520 and time stamp component 336 function to effectively control the maximum amount of jitter introduced by the network switch 280 when routing voice packets.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. A multiport network device comprising:
   a plurality of receive ports configured to receive frames in a packet-switched network, the frames each having a source field indicating the source of the frame and a destination field indicating an intended destination for the frame;
   a plurality of transmit ports configured to transmit the frames in the packet-switched network;
   a time-stamping component connected to receive the frames from the plurality of receive ports, the time-stamping component appending a time-stamp value to the received frames that correspond to voice transmissions; and
   output queues corresponding to the transmit ports and connected to receive the frames from the output of the time-stamping component, the output queues forwarding the received frames to appropriate ones of the transmit ports, the output queues expediting the forwarding of the received frames that have appended time-stamp values after a predetermined period of time has elapsed from the time-stamp value, each of the output queues further comprising
      write side FIFO queues configured to receive the frames from an output of the time-stamping component,
      read side FIFO queues configured to transmit the frames received by the write side FIFO queue to the transmit port corresponding to the output queue, and
      a time-stamp control component that expedites the forwarding of the received frames that have the appended time-stamp values after the predetermined period of time has elapsed by controlling writing of the input frames in which the predetermined period of time has elapsed to the read side FIFO queues as soon as space is available in the read side FIFO queues.

2. The multiport network device of claim 1, further comprising:
   an internal rules checking circuit coupled to the receive ports and configured to determine frame forwarding information that indicates from which of the plurality of transmit ports the received frames should be transmitted, the internal rules checking circuit tagging the frame forwarding information to indicate whether the frame corresponding to the frame forwarding information carries voice data.

3. The multiport network device of claim 2, wherein the internal rules checking circuit tags the frame forwarding information to indicate whether the frame corresponding to the frame forwarding information carries voice data based on the source of the frame.

4. The multiport network device of claim 2, wherein the internal rules checking circuit tags the frame forwarding information to indicate whether the frame corresponding to the frame forwarding information carries voice data based on an indication set in the frame that the frame should be treated as a real-time frame.

5. The multiport network device of claim 1, wherein each of the output queues further comprises:
   an overflow engine connected between the write side FIFO queues and the read side FIFO queues, the overflow engine configured to input the frames from the write side FIFO queues and, when space is available in the read side FIFO queues, write the input frames to the read side FIFO queues, and when space is not available in the read side FIFO queues, write the input frames to an external memory.

6. The multiport network device of claim 5, wherein the overflow engine transfers frames from the external memory to the read side FIFO queues when space becomes available in the read side FIFO queues.

7. The multiport network device of claim 5, wherein each the time-stamp control component is connected to the overflow engine and the external memory.

8. The multiport network device of claim 7, wherein the time-stamp control component includes a table having entries that each includes the time stamp value of the frame and a pointer to the location of the frame forwarding information in the external memory.

9. The multiport network device of claim 1, wherein each of the write side FIFO queues comprises:
   a high priority FIFO queue for queuing high priority frame forwarding information from the output of the time-stamping component; and
   a low priority FIFO queue for queuing low priority frame forwarding information from the output of the time-stamping component.

10. The multiport network device of claim 1, wherein each of the read side FIFO queues comprises:
   a high priority FIFO queue for queuing high priority frame forwarding information before transmitting the high priority frames to the transmit port; and
   a low priority FIFO queue for queuing low priority frame forwarding information before transmitting the low priority frames to the transmit port.

11. A method of processing packets in a network device comprising:
   receiving frames at the network device, the frames including a source field indicating a source of the frame and a destination field indicating an intended destination for the frame;
   determining whether each of the received frames includes associated voice information;
   appending a time stamp value to received frames associated with the voice information;
   receiving the frames in an output queue associated with a transmission port of the network device, wherein receiving the frames in the output queue further includes writing frames to an external memory when a read side portion of the output queue is full; and
   expediting processing of the received frames, which have the appended time stamp values, in the output queue after a predetermined period of time has elapsed since the time stamp value.

12. The method of claim 11, wherein expediting processing of the received frames that have the time stamp values includes writing the frames in which the predetermined period of time has elapsed to the read side portion of the output queue as soon as space is available in the read side portion of the output queue.

13. The method of claim 11, wherein determining whether each of the received frames includes associated voice information includes checking a tag associated with the received frame.

14. The method of claim 13, further comprising:
   determining frame forwarding information that indicates from which of a plurality of transmit ports of the network device the frame should be transmitted.

15. The method of claim 14, further comprising:
tagging the frame forwarding information to indicate whether the frame corresponding to the frame forwarding information carries voice data based on the source of the frame.

16. The method of claim 14, further comprising:
tagging the frame forwarding information to indicate whether the frame corresponding to the frame forwarding information carries voice data based on an indication set in the frame that the frame should be treated as a real-time frame.

17. A system for processing packets in a network device comprising:
means for receiving frames at the network device, each of the frames including an indication of whether the frame includes voice data;
means for appending a time stamp value to the received frames that include voice data;
means for queuing the received frames for each of a plurality of transmission ports of the network device, the means for queuing further including means for writing the received frames to an external memory when a read side portion of the means for queuing is full; and
means for expediting processing of the received frames that have appended time stamp values after a predetermined period of time has elapsed since the time-stamp value.

18. The system of claim 17, wherein the means for expediting processing of the received frames that have appended time stamp values includes:
means for writing the frames in which the predetermined period of time has elapsed to the read side portion of the means for queuing as soon as space is available in the read side portion of the means for queuing.

* * * * *

UNITED STATES PATENT AND TRADEMARK OFFICE
CERTIFICATE OF CORRECTION

PATENT NO. : 6,944,174 B1
DATED : September 13, 2005
INVENTOR(S) : Peter Ka-Fai Chow It is certified that error appears in the above-identified patent and that said Letters Patent is hereby corrected as shown below:

Column 10,
Line 7, the word "each" should be deleted.

Signed and Sealed this

Fifteenth Day of November, 2005

JON W. DUDAS
*Director of the United States Patent and Trademark Office*